(12) United States Patent
Yu et al.

(10) Patent No.: US 10,747,659 B2
(45) Date of Patent: Aug. 18, 2020

(54) FLASH FAST PROGRAM MODE FOR HIGH DEFINITION VIDEO RECORDING AND HIGH RESOLUTION CAMERA BURST MODE RECORDING

(71) Applicant: Western Digital Technologies, Inc., San Jose, CA (US)

(72) Inventors: Weijie Yu, Milpitas, CA (US); Rohit Sehgal, San Jose, CA (US); Zachary David Shepard, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 94 days.

(21) Appl. No.: 15/890,118

(22) Filed: Feb. 6, 2018

(65) Prior Publication Data

US 2019/0243754 A1 Aug. 8, 2019

(51) Int. Cl.
*G06F 12/02* (2006.01)
*G06F 12/0866* (2016.01)
(Continued)

(52) U.S. Cl.
CPC ...... *G06F 12/0246* (2013.01); *G06F 12/0866* (2013.01); *G06F 12/122* (2013.01);
(Continued)

(58) Field of Classification Search
None
See application file for complete search history.

(56) References Cited

U.S. PATENT DOCUMENTS 7,433,994 B2 10/2008 Petersen et al.
2002/0081090 A1 6/2002 Agnihotri et al.
(Continued)

FOREIGN PATENT DOCUMENTS

CN 1933575 A 6/2010
CN 204291206 U 4/2015
(Continued)

OTHER PUBLICATIONS

Cai, Yu, et al. "Error characterization, mitigation, and recovery in flash-memory-based solid-state drives." Proceedings of the IEEE 105.9 (Aug. 18, 2017): 1666-1704. (Year: 2017).*
(Continued)

*Primary Examiner* — Charles Rones
*Assistant Examiner* — Hewy H Li
(74) *Attorney, Agent, or Firm* — Loza & Loza, LLP; Gabriel Fitch

(57) ABSTRACT

The present disclosure, in various embodiments, describes technologies and techniques for use by a memory controller or similar device for storing sequential image data or other data streams composed of pages of data. In one example, the memory controller compares data within current and previous image frames on a page-by-page basis. If a pair of pages match, the memory controller creates a link between the two pages so the duplicate page need not be stored. During a subsequent read operation, the flash controller accesses stored links to identify the physical storage addresses of any matching pages stored in connection with a previous frame to permit efficient retrieval. In some examples, a page is compared with both the previous corresponding page and with the neighboring pages of that previous page. Exemplary read, write and erase operations are described herein using the links.

21 Claims, 14 Drawing Sheets

(51) Int. Cl.
*H04N 5/232* (2006.01)
*H04N 5/907* (2006.01)
*G06F 12/122* (2016.01)

(52) U.S. Cl.
CPC ......... *H04N 5/23232* (2013.01); *H04N 5/907* (2013.01); *G06F 2212/2022* (2013.01)

(56) References Cited

U.S. PATENT DOCUMENTS

| | | | |
|---|---|---|---|
| 2004/0008779 A1* | 1/2004 | Lai | H04N 19/433 375/240.16 |
| 2005/0163220 A1* | 7/2005 | Takakura | H04N 19/105 375/240.16 |
| 2009/0043948 A1 | 2/2009 | Wittenburg et al. | |
| 2011/0060887 A1* | 3/2011 | Thatcher | G06F 3/0604 711/171 |
| 2012/0106852 A1* | 5/2012 | Khawand | H04N 19/619 382/218 |
| 2014/0281361 A1* | 9/2014 | Park | G06F 3/0641 711/206 |
| 2015/0199138 A1 | 7/2015 | Ramachandran et al. | |
| 2015/0294187 A1* | 10/2015 | Sorakado | G06K 9/6215 382/195 |

FOREIGN PATENT DOCUMENTS

| | | |
|---|---|---|
| CN | 106101596 A | 11/2016 |
| JP | 2015080149 A | 4/2015 |

OTHER PUBLICATIONS

Chen, Ming, Shupeng Wang, and Liang Tian. "A High-precision Duplicate Image Deduplication Approach." JCP 8.11 (2013): 2768-2775. (Year: 2013).*

Hu, Xiao-Yu, et al. "Write amplification analysis in flash-based solid state drives." Proceedings of SYSTOR 2009: The Israeli Experimental Systems Conference. ACM, 2009. (Year: 2009).*

Dufaux, Frederic, and Fabrice Moscheni. "Motion estimation techniques for digital TV: A review and a new contribution." Proceedings of the IEEE 83.6 (1995): 858-876. (Year: 1995).*

Roodaki-Lavasani, Hoda, and Jani Lainema. "Efficient burst image compression using H. 265/HEVC." Mobile Devices and Multimedia: Enabling Technologies, Algorithms, and Applications 2014. vol. 9030. International Society for Optics and Photonics, 2014. (Year: 2014).*

SD Association, "SD Standard for Video Recording"; Date Unknown; https://www.sdcard.org/developers/overview/speed_class/; 4 pages.

SanDisk, "SanDisk Extreme SD UHS-I Card"; 2017; https://www.sandisk.in/home/memory-cards/sd-cards/extreme-sd-uhs-i; 11 pages.

* cited by examiner

*Further exemplary operations for use with a Memory Controller to Store Recordings* — 1200

1202 — Compare first and second frames of an input recording (or other data stream) to identify a matching portion, where the first and second frames are consecutive frames of a video recording or consecutive frames of burst-mode photographic images, and where the matching portion is identified by comparing a segment N of the first frame with a corresponding segment N of the second frame or with any segments M of the first frame that are adjacent to the segment N of the first frame to detect an identical match (or, alternatively, a substantial match).

1204 — Store the first frame at first physical addresses within a NAND while including the matching portion by storing each segment N of the first frame.

1206 — Store the second frame at second physical addresses within the NAND while excluding the matching portion by storing each segment M of the second frame that does not match any segment N of the first frame, and then repeat for additional frames.

1208 — Store a link between the second frame and the matching portion of the first frame by generating an index that links a logical address of the portion of the second frame that is not stored with a physical address of the matching portion of the first frame that is stored, and then repeat for additional frames.

1210 — During a subsequent read operation, read the entire first frame of the recording from the memory device and then read the second frame while using the link to obtain the matching portion (excluded during storage of the second frame but included during storage of the first frame).

1212 — Combine the matching portion obtained from first frame with other portions of the second frame read from the memory device to reconstruct the second frame, and repeat for additional frames.

FIG. 12

*Further exemplary operations for use with a Memory Controller to Read Recordings*

1400

Access a memory device in which a recording (or other data stream) is stored having first and second frames, where a portion of the second frame that matches a portion of the first frame is stored along with the first frame but not along with the second frame, and where the first and second frames are consecutive frames of a video recording or consecutive frames of burst-mode photographic images, and where matching portion is a segment N of the second frame that identically (or substantially) matches a corresponding segment N of the first frame or identically (or substantially) matches any segments M of the first frame that are adjacent to segment N of the first frame.

1402

Read the entire first frame of the recording from the memory device by reading each segment N of the first frame.

1404

Read the second frame of the recording from the memory device while obtaining the matching portion stored along with the first frame by reading each segment of the second frame that is stored for the second frame and reading any matching portion N that was stored along with the first frame by accessing an index that links a logical address of the matching portion of the first frame to the second frame.

1406

Combine the matching portion obtained from first frame with other portions of the second frame read from the memory device to reconstruct the second frame, and repeat for additional frames.

FLASH FAST PROGRAM MODE FOR HIGH DEFINITION VIDEO RECORDING AND HIGH RESOLUTION CAMERA BURST MODE RECORDING

FIELD

The present disclosure, in various embodiments, relates to flash-based non-volatile memory (NVM) storage systems and methods for use therewith. More specifically, the disclosure relates, in some examples, to high speed storage of data for high definition (HD) video and high resolution (HR) burst mode photography using flash-based NVM devices.

INTRODUCTION

The demand for high definition (HD) video recording is increasing and requires correspondingly higher write speeds to flash-based non-volatile memory (NVM) storage systems than with predecessor video systems. As both the resolution and frame per second (FPS) are increasing, flash write speeds can be a bottleneck for efficient HD video recording. Similar issues arise with high resolution (HR) burst mode photography wherein dozens of HR images may be taken per second by the camera, such as in a sports photography mode. HD video and HR burst mode photography also impose significant burdens on the amount of flash memory required to store all the individual frames or images. Still further, flash memory devices have a finite lifespan that may be reduced when a large number of HD video frames or HR photography images are stored and later erased and overwritten. Although such issues are particularly notable with HD video or HR photography, similar issues may arise whenever a data stream is to be recorded in a short period of time that includes large amounts of data.

It would be advantageous to provide improved recording techniques for use with flash-based HD video recordings and flash-based HR camera burst mode recordings or in other applications where large amounts of data are to be saved in a short period of time.

SUMMARY

One embodiment of the present disclosure provides a method for use with a memory device, including: comparing first and second frames of an input data stream to identify a matching portion; storing the first frame at first physical addresses within the memory device while including the matching portion; storing the second frame at second physical addresses within the memory device while excluding the matching portion; storing a link between the second frame and the matching portion of the first frame; and reading the second frame from the memory device while using the link to obtain the matching portion that was excluded during storage of the second frame but was included during storage of the first frame.

Another embodiment of the present disclosure provides a memory controller for use with a memory device, where the memory controller includes a processor configured to: compare first and second frames of an input data stream to identify a matching portion; store the first frame at first physical addresses within the memory device while including the matching portion; store the second frame at second physical addresses within the memory device while excluding the matching portion; store a link between the second frame and the matching portion of the first frame; and read the second frame from the memory device while using the link to obtain the matching portion that was excluded during storage of the second frame but was included during storage of the first frame.

Yet another embodiment of the present disclosure provides an apparatus for use with a memory device, comprising: means for comparing first and second frames of an input data stream to identify a matching portion; means for storing the first frame at first physical addresses within the memory device while including the matching portion; means for storing the second frame at second physical addresses within the memory device while excluding the matching portion; means for storing a link between the second frame and the matching portion of the first frame; and means for reading the second frame from the memory device while using the link to obtain the matching portion that was excluded during storage of the second frame but was included during storage of the first frame.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which:

FIG. 12 further summarizes exemplary operations for use with the memory controller of FIG. 10 to store recordings or other data streams.

FIG. 14 further summarizes exemplary operations for use with the memory controller of FIG. 10 to store recordings or other data streams.

DETAILED DESCRIPTION

Figure 1:
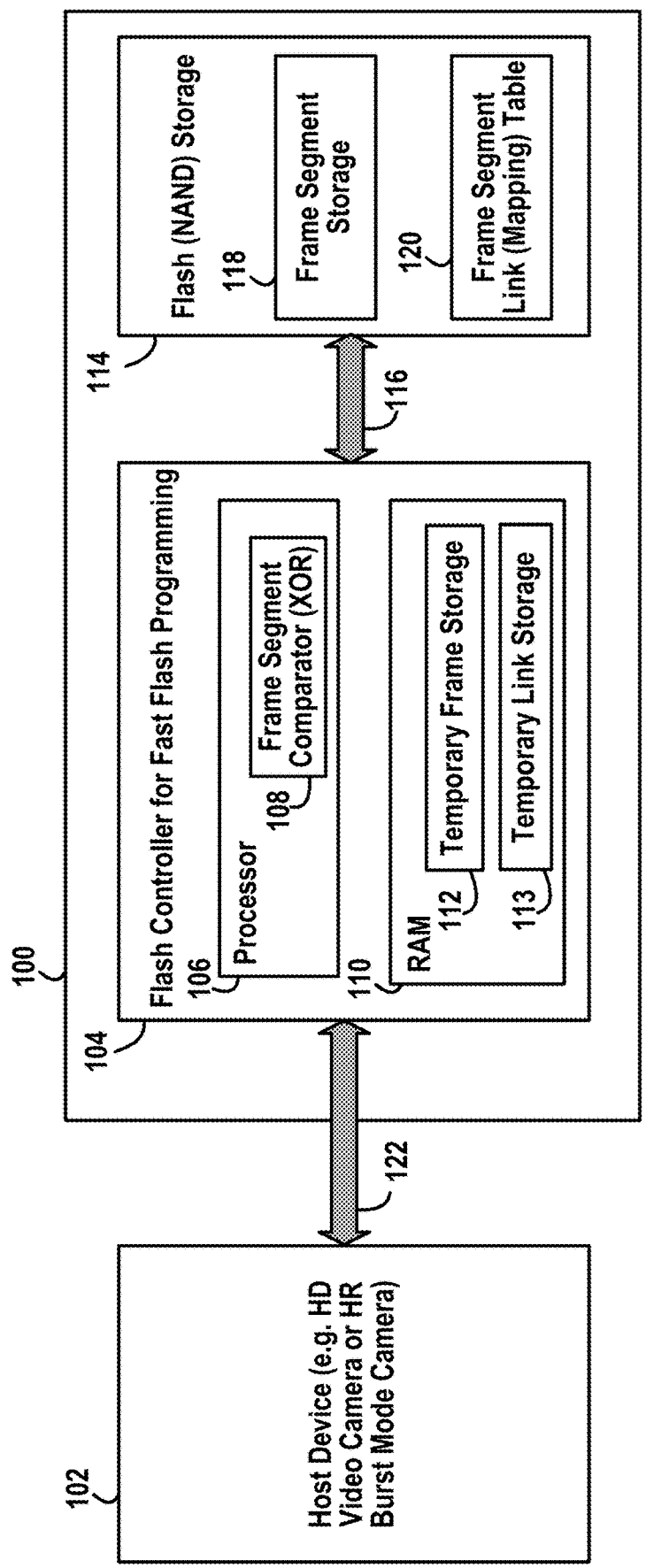
FIG. 1 illustrates an exemplary configuration of a system with a flash controller coupled to a flash storage device and a host device, where the flash controller is configured to perform fast flash programming of a sequence of image frames or other input data stream.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Overview

Aspects of the present disclosure provide various apparatus, devices, systems and methods for a "flash fast program mode" for solid state device (SSD) flash drives or other drives employing non-volatile memory (NVM), or for use with other storage devices. For many or most videos, adjacent video frames contain a considerable amount of the same information, especially at high FPS video rates. Therefore, adjacent frames may have much of the same data to be written to the flash array between two consecutive frames. When the fast program mode described herein is enabled, the flash controller temporarily holds the data of the previous frame in random access memory (RAM) and then compares the data of the current and previous frames. In an example where the minimum write size is a NAND page, the comparison may be on a page-by-page basis with the firmware of the flash controller comparing the data of two pages corresponding to the same X-Y location within the previous and current frames. If two pages contain identical data, the flash controller creates a link between the two pages to enable a single reference to the linked page that corresponds with the previous frame. That is, the flash drive need not store pages of the current frame that match pages already stored for the previous frame. This may allow faster storage rates to accommodate high frame rate recordings (i.e. high frame rate data streams) and may also help extend the lifespan of the memory device, since the memory device need not store as much data as compared to systems that would separately store all pages for all frames. During a subsequent read operation, the firmware of the flash controller uses the stored links to identify the storage locations (e.g. physical memory addresses) of any matching portions of a frame stored in connection with a previous frame so each complete frame may be reconstructed from the stored pages of data.

In some examples, when the fast program mode is set ON, the host device (e.g., smartphone, video camera, etc.) provides a suitable flag signal between each pair of adjacent frames so the flash drive may determine which groups of data belong to the same frame. When the data of a first frame is transferred to the flash drive, the flash controller programs all the data to its NAND array and the data remains in the RAM even when the program operation is finished. When the data of the second frame is transferred from the host to the flash drive, the first frame then becomes the previous frame, and the flash controller performs a comparison of the data of the current frame and the previous frame that remains in the RAM.

The compare operation may be enabled through an exclusive-or (XOR) engine or XOR component of the flash controller, which may begin to run as soon as two frames of data are available. In an exemplary embodiment, if a segment (e.g. a portion of the frame the size of a NAND page) of input image data is found to be same in a pair of consecutive frames, a link is established by the flash controller between the two pages. When enough data is accumulated in RAM, the flash controller performs a flash write operation only for one of the linked pages and, once the operation has completed, the firmware releases the data in the RAM for both of the linked pages. Since a link is maintained in a linking table (which may also be referred to as a control table or a mapping table) for all the pages that are linked together (i.e. adjacent frames that have at least one matching page), the total number of pages written to the flash memory may be minimized. The overall flash write time can thus be improved. The same NAND location may be used to service any reads to the linked pages. Note that firmware on the flash drive may be notified (or otherwise made aware) of the frame size from the host device so the flash controller can process the data corresponding to each input frame separately to compare it with the next input frame on demand during runtime. Although described primarily herein with respect to high-definition (HD) video, the flash fast program mode may be employed with high resolution (HR) burst mode photography and with other streams of input data where separate frames may include matching data, such as with high speed logic analyzers.

Using the fast program mode techniques described herein, flash write speeds may be increased significantly for HD video recordings, HR burst mode photography, and other applications without requiring any major changes to flash controller hardware specifications. In addition, the total recorded size of the video or burst mode images may be reduced without sacrificing image quality while improving the total recording time of the images. The techniques described herein may be advantageous whenever memory write speed is a bottleneck and the data to be stored contains significant portions of identical information. That is, at least some of the techniques described herein may apply to processing any data stream that involves large amounts of data to be stored over a short time period or short duration, where the data has substantial similarity that can be exploited.

Exemplary Flash Storage Embodiments

FIG. 1 illustrates, at a high level, a flash memory storage system 100 that receives data for storage from a host device 102 (such as HD video from an HD video camera or HR burst mode images from a HR camera). A flash controller 104 includes a processor 106 with a frame segment comparator 108, such as XOR engine. The flash controller 104 also includes a RAM 110 with temporary frame storage 112 for temporarily storing consecutive frames on input data to identify any matching segments (e.g. pages) so that the aforementioned links may be generated between matching segments. The RAM 110 may also include temporary link storage 113 for storing the links during run-time processing. Once a pair of consecutive frames has been processed by the flash controller 104, the segments of those frames and any links created therebetween are stored in an NVM flash storage device 114 (such as a NAND) via internal bus 116. The flash storage 114 includes a frame segment storage portion 118 for storing the segments (e.g. pages) of various frames and a frame segment link (mapping) table 120 for storing the links between the segments. As such, the linking table may be initially generated in RAM, then transferred to the NAND so that the flash controller can access the links following a subsequent power-up. Data is initially received by the flash controller 104 from the host device 102 along an external bus 122, which may also output data to the host device 102.

In use, as each new image frame is received along bus 122, the frame is stored in temporary frame storage 112 along with the previous frame. The processor 106 then applies the latest (current) frame and the previous (last) frame to the frame segment comparator 108 to compare the frames and identify matching segments (e.g. identical pages). The details of the procedure, which may include comparing pages of the current frame against both a corresponding page of the previous frame and adjacent pages to that corresponding page of the previous frame, will be described below. Whenever a match is found that permits a segment of the current frame to be omitted (or excluded) during storage of the current frame, a suitable link is generated by the processor 106. All segments of the current frame that were not found to match a segment of the previous frame (and hence need to be stored) are then transferred to the flash storage 114 for storage in frame segment storage 118. Any segments of the current frame that were found to match a segment of the previous frame (and hence need not be stored) are not transferred to the flash storage 114. Rather, only the corresponding link is sent to the flash storage 114 for storage with other links in the frame segment link table (mapping) 120.

To retrieve a sequence of previously stored frames, the procedure may be reversed. Briefly, the segments of the first frame of an image sequence are retrieved by the flash controller 104 from the frame segment storage 118 along bus 116 for output to the host device 102 that originally provided the images or to a separate display device (not shown). For the second frame, all segments stored for that frame are retrieved from the frame segment storage 118 along with any matching segments from the first frame (located using the links within the frame segment link table 120). The processor then reconstructs the complete second frame by combining the various segments together for output to the host device 102. Each additional frame is then processed in a similar manner Note that for a third frame, links within the frame segment link table 120 might link segments from that frame to a segment originally stored only in connection with the first frame (e.g. if a particular image segment remains unchanged in the three consecutive frames). Nevertheless, the processor then reconstructs the complete third frame by combining its various segments together for output to the host device 102.

In practice, many segments of frames may be linked back to previous frames to significantly reduce the amount of data that needs to be stored and eventually retrieved. For many HR videos, a 50% reduction in storage may be achieved, with a corresponding increase in write speeds due to the reduced amount of data transfer to the NAND. This improvement in flash drive write speed may be achieved without any major changes to the hardware. A host device (such as a smartphone) may therefore capture images at higher FPS and resolution.

Note that in some implementations the flash controller 104 of FIG. 1 may be physically located or installed within the host device 102. For example, if the host processor 102 is implemented as a single die, the flash controller 104 may be incorporated on the same die. This technique is used, for example, in Open Multimedia Applications Platform (OMAP) processors. Alternatively, the flash controller 104 may be configured as a separate physical element coupled between the host processor 102 and the NAND 114. This architecture is used, e.g., in portable Universal Serial Bus (USB) Flash Drives (UFDs), where the flash controller 104 may be packaged inside the UFD and interacts, on one side, using a device-side interface with the NAND 114 and also interacts, on the other side, with a processor of the host device 102 using a host-side interface (e.g., USB interface with USB protocol). In a system using such an architecture, the host 102 may interact with the flash controller 104 using a standard protocol such as USB or Advanced Technology Attachment (ATA), as the interaction is external to the host processor, it is thus more convenient to use standard protocols that are already supported by the processor for other purposes. Still further, in other examples, the flash controller 104 may be physically located within the NAND 114 as a component thereof. See, for example, mobile disk on chip (mDOC) storages devices. In a system with this architecture, the host 102 may interact with the flash controller 104 using either a standard protocol such as USB or a semi-standard protocol as is the case in the mDOC. As can be appreciated, features of the flash fast program mode described herein may be implemented in any of a variety of different flash system architectures and within non-flash storage devices as well.

Figure 2:
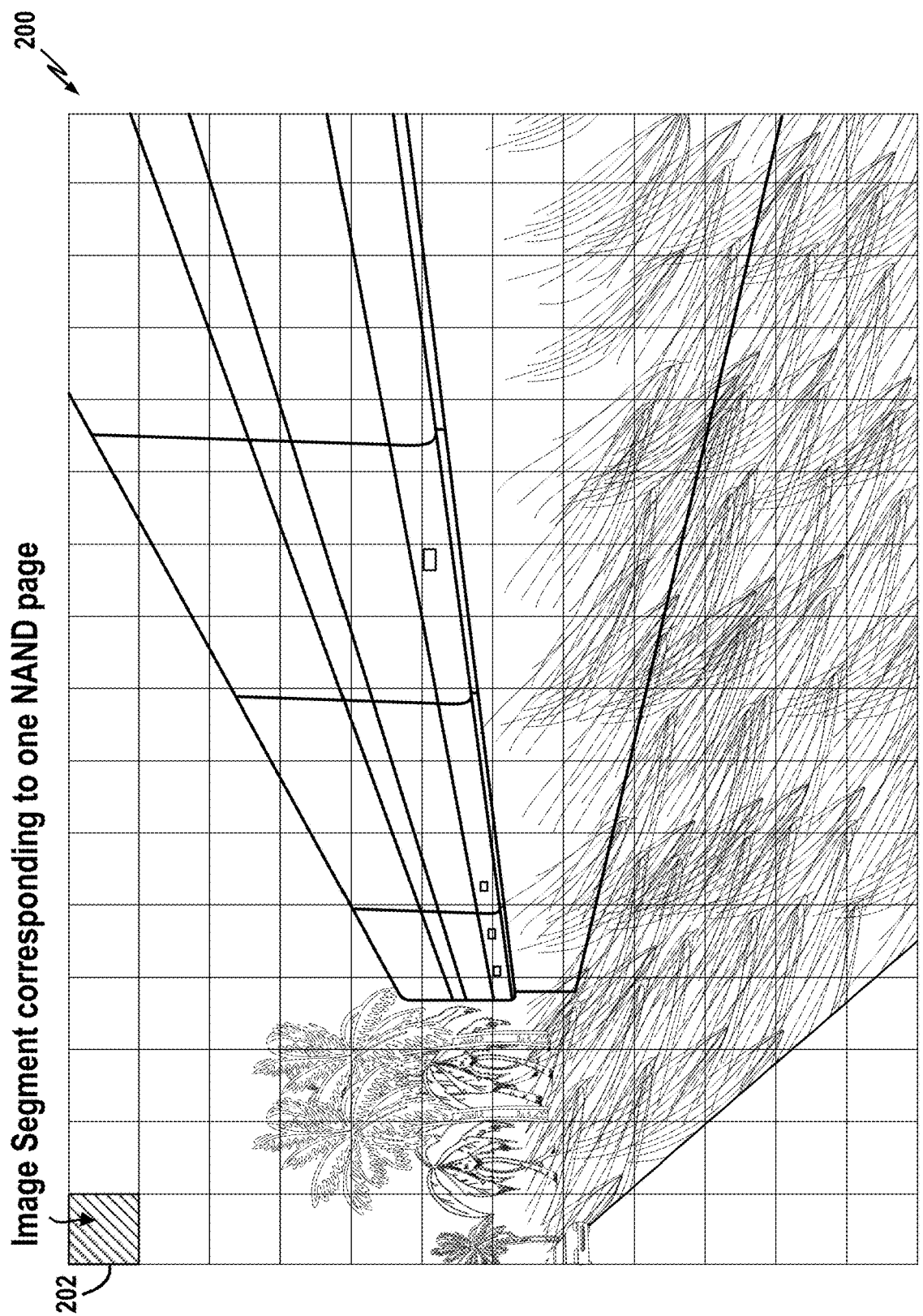
FIG. 2 illustrates an exemplary frame of a sequence of image frames for processing by the flash controller of FIG. 1, and particularly illustrating individual page-sized frame segments of the exemplary frame for storage in a NAND memory device.

FIG. 2 illustrates an exemplary frame 200 from a video image, where the frame is subdivided into segments 202, each corresponding to one page of a NAND storage device. For many current NAND flash devices, the granularity of programming on the NAND is a word line (WL) or page, which is 8 (kilobyte) KB/16 KB for a single level cell (SLC). For a 4K HR video, the file size is often about 20 MB (megabyte). Without the use of any compression algorithm, storage of the HR video might require more than two thousand SLC pages to store the image of the corresponding size. Even with a compression algorithm such as JPEG, where the image size may be reduced by 90%, storage might still require more than two hundred SLC pages to store the video. In other words, each SLC page stores only a small portion of the whole image. However, for HR burst mode or HD video recording, the time interval of the adjacent frames is often less than 40 ms at 30 fps. Therefore, two adjacent frames often contain many pages of identical data that can be linked together and programmed to flash as a single entity.

Figure 3:
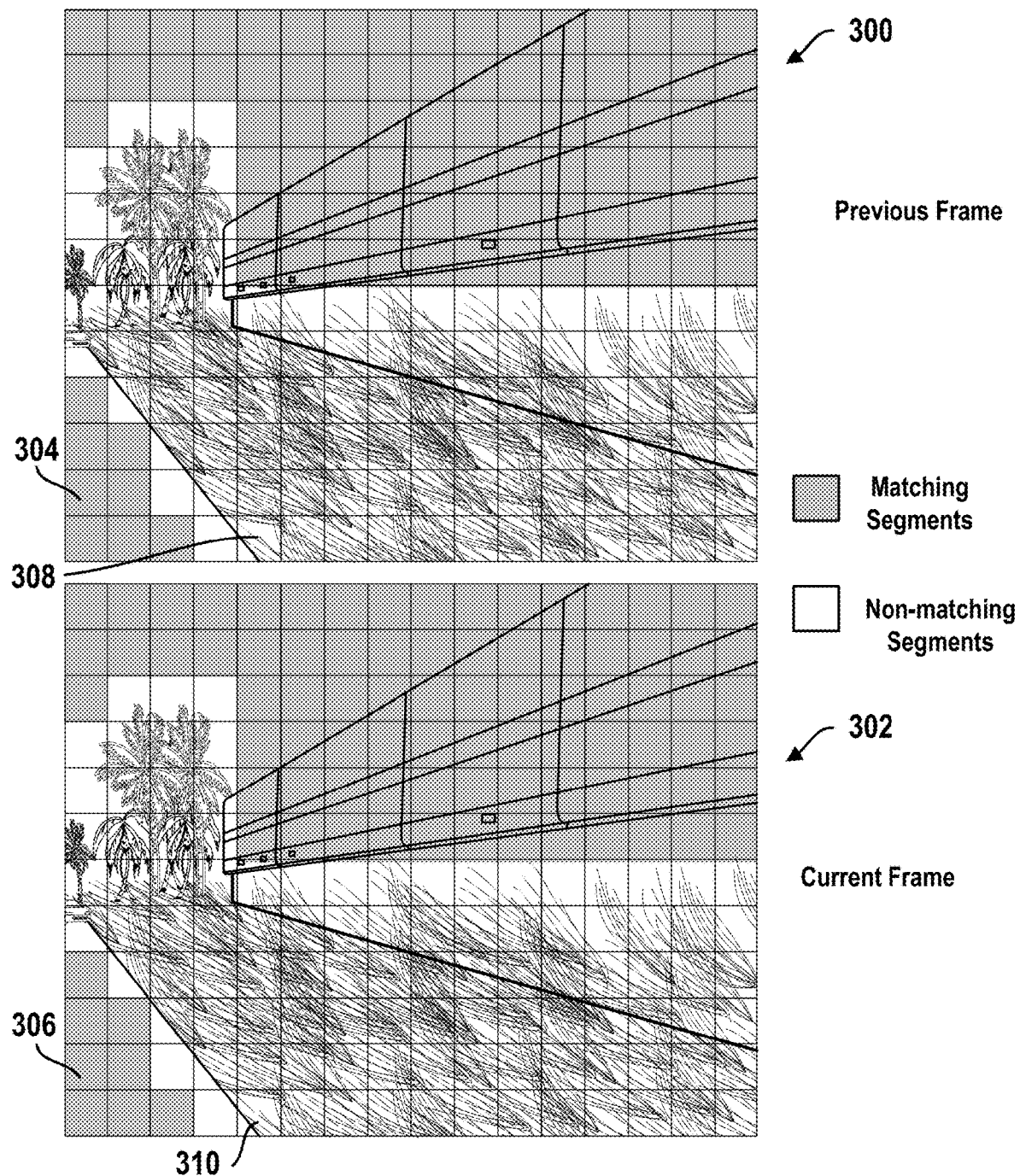
FIG. 3 illustrates exemplary previous and current frames of a sequence of image frames for processing by the flash controller of FIG. 1, and particularly illustrating matching frame segments within the previous and current frames.

FIG. 3 illustrates an exemplary previous frame 300 and a current frame 302 that have several identical 8 KB page sections or segments. The identical (matching) segments are tinted gray in the figure and include, for example, segment 304 of frame 300 and identical segment 306 of frame 302. Non-identical (non-matching) segments include, for example, segment 308 of frame 300 and segment 310 of frame 302. In the particular example of FIG. 3, the portions of the frames that correspond to the sky, the building and the foreground street match from one frame to the next since these portions of the frames are static. The portions of the frames that correspond to trees and shrubbery differ subtly from one frame to the next due to, for example, a breeze that may rustle the leaves of the trees and shrubbery. As already explained, the flash fast program mode described herein takes advantage of matching segments by creating links between pages containing the same data instead of programming all such pages. This may be described as exploiting a "partial-identical" property of consecutive frames, i.e. some portions of consecutive frames are identical (although other portions are not).

Figure 4:
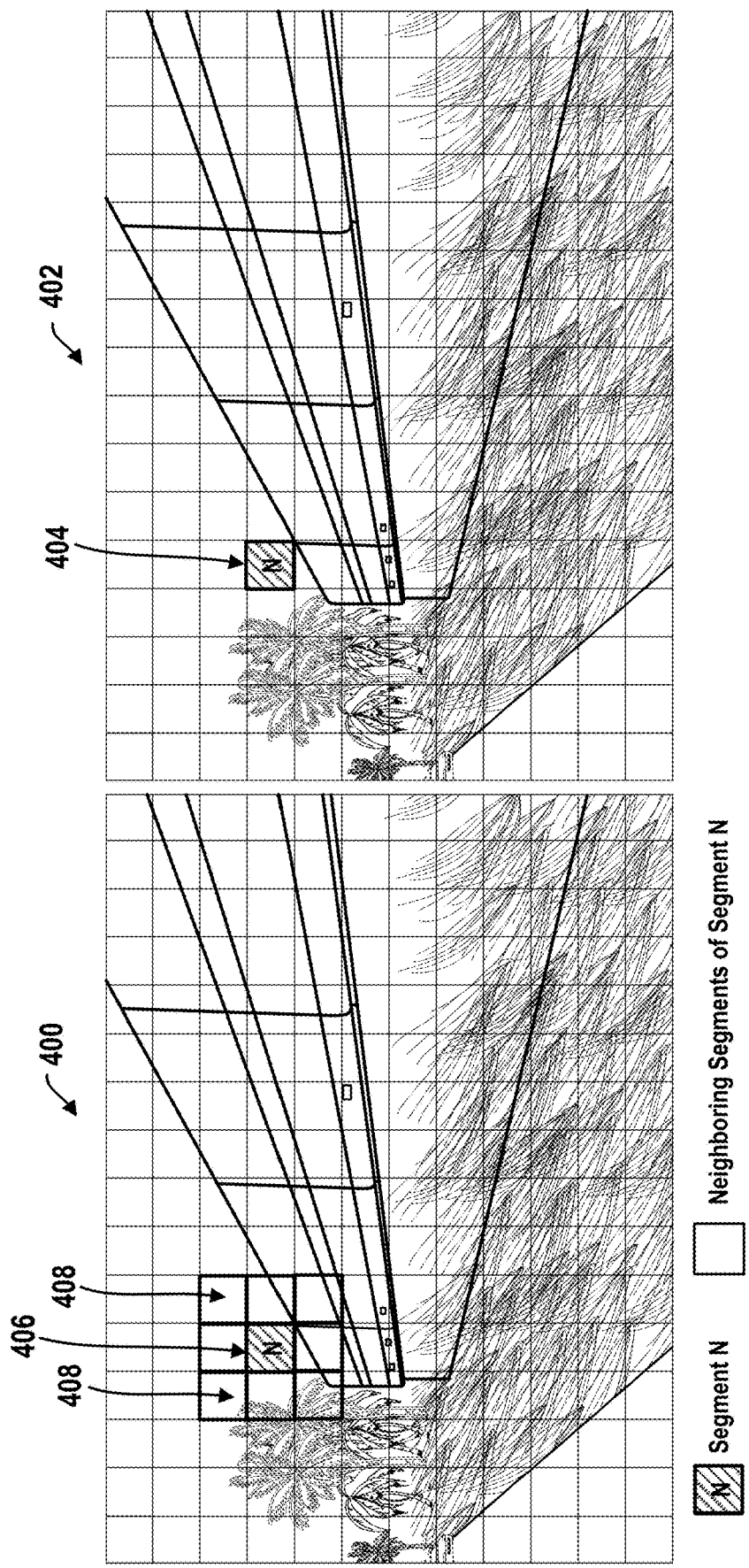
FIG. 4 illustrates exemplary previous and current frames of a sequence of image frames for processing by the flash controller of FIG. 1, and particularly illustrating a segment of the current frame, its corresponding segment in the previous frame, and the neighboring frames to that corresponding segment.

FIG. 4 illustrates that each page segment of a frame may be compared with the page segment at the same location in the previous frame and its adjacent (or neighboring) segments. That is, FIG. 4 shows a first (previous) frame 400 and a second (current) frame 402. An exemplary segment N in the current frame is highlighted (segment 404) along with the corresponding segment N of the previous frame (segment 406) and its eight adjacent or neighboring segments 408, which are above, below, or diametrically adjacent to segment 406.

All the segments of a particular frame may be labeled by the firmware of the flash drive based on their location in the frame. When the data of the current frame is transferred from the host device to the RAM of the flash drive, the flash controller scans the segments one by one. For Segment N 404 in the current frame 402, the flash controller performs a XOR comparison on the corresponding Segment N 406 in the previous frame 400. If the XOR does not detect or identify an identical match (i.e. the flash drive does not detect the identicalness of the two segments N that are compared), the flash controller continues by then comparing the current segment N 404 with the segments 408 surrounding the segment N 406 in the previous frame 400. If the flash controller detects a match (i.e. identicalness), a link between the matching segments is created. If the flash controller does not find or detect a match in segment 406 and any of segments 408, the flash controller programs the data of segment N 404 into the NAND array. This procedure may be performed by, e.g., beginning at the top left corner of an image frame and proceeding sequentially left to right, row by row, until reaching the bottom right corner of the frame. Each segment N of the current frame is thereby sequentially compared against corresponding segments of the previous frame and its adjacent segments. (As can be appreciated, for segments on the edges or corners of an image frame, fewer adjacent segments are processed during the comparison.) Alternatively, other specific procedures may be employed for selecting the order by which the segments are compared, such as by proceeding column by column rather than row by row or selecting a different starting segment.

Once all the segments of the second frame 402 either have been linked to the source pages (i.e. the matching page of a previous frame) or have been physically programmed to the NAND array, the flash controller flushes the data of the previous frame while maintaining the data of the current frame so the flash controller may then perform the same XOR comparison on the next (new) frame in RAM. Although a XOR is employed in the exemplary embodiments described herein, other comparison devices or procedures may be used to detect matching segments. In some examples, rather than detecting an exact match, the flash controller may be configured to instead detect a substantial match, i.e. the flash drive determines whether nearly all of the bits of one segment match those of the comparison segment (based on some predetermined threshold of similarity such as if at least 99.9% of the bits match). XOR's are used in the embodiments described in detail herein because a XOR is particularly efficient, and flash drives often already include XOR engines that may be easily exploited for the page comparison purposes described herein.

Figure 5:
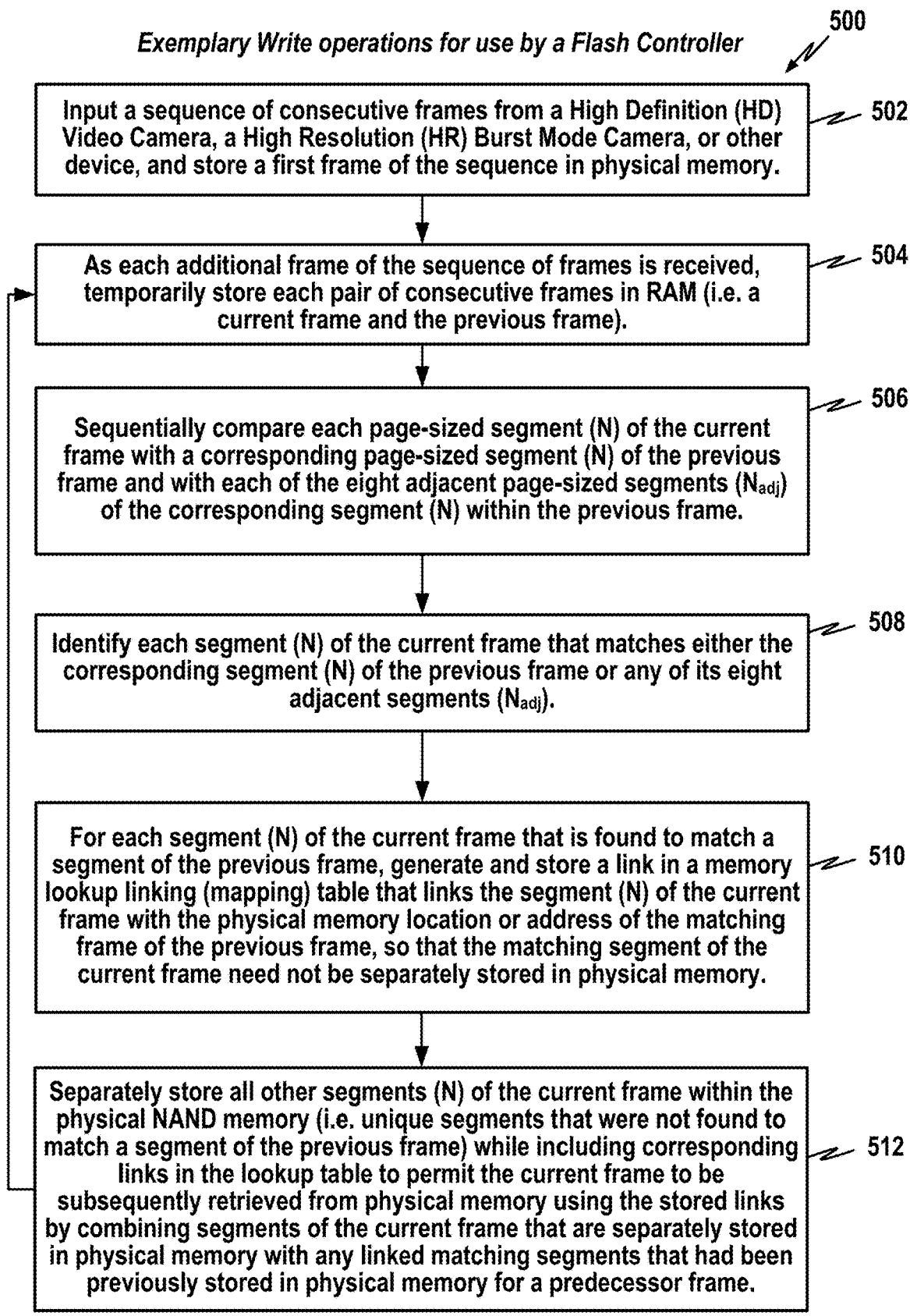
FIG. 5 illustrates exemplary write operations for use with the flash controller of FIG. 1.

FIG. 5 illustrates an exemplary write procedure 500 for use by a flash drive controller to perform the "flash fast program mode" procedure. At 502, the flash controller inputs a sequence of consecutive frames from an HD Video Camera, HR Burst Mode Camera or other device, and stores a first frame of the sequence in physical memory. At 504, as each additional frame of the sequence of frames is received, the flash drive controller temporarily stores each pair of consecutive frames in RAM (i.e. a current frame and the previous frame). At 506, the flash controller sequentially compares each page-sized segment (N) of the current frame with a corresponding page-sized segment (N) of the previous frame and with each of the eight adjacent page-sized segments ($N_{adj}$) of the corresponding segment (N) within the previous frame. At 508, the flash controller identifies each segment (N) of the current frame that matches either the corresponding segment (N) of the previous frame or any of its eight adjacent segments ($N_{adj}$). At 510, for each segment (N) of the current frame that is found to match a segment of the previous frame, the flash controller generates and stores a link in memory lookup table (LUT) that links the segment (N) of the current frame with the physical memory location (e.g. address) of the matching frame of the previous frame, so that the matching segment of the current frame need not be separately stored in physical memory. At 512, the flash controller separately stores all other segments (N) of the current frame within the physical NAND memory (i.e. unique segments that were not found to match a segment of the previous frame) while including corresponding links in the lookup linking table to permit the current frame to be subsequently retrieved from physical memory using the stored links by combining segments of the current frame that are separately stored in physical memory with any linked matching segments that had been previously stored in physical memory for a predecessor frame. Processing may then return to block 504 to process a next frame. The procedure may be repeated until all frames of an input recording or other input data stream are processed and stored in the NAND memory.

Figure 6:
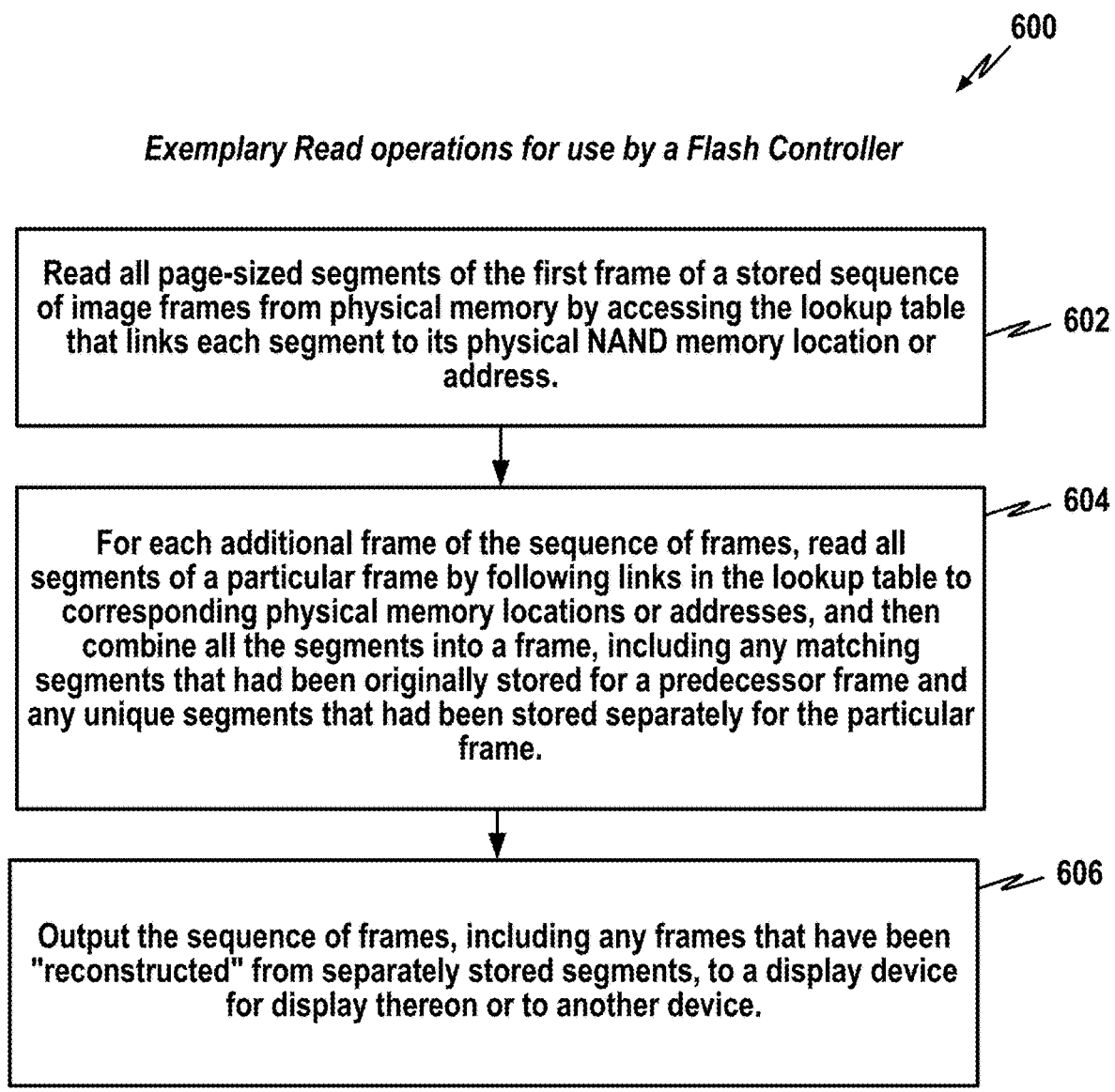
FIG. 6 illustrates exemplary read operations for use with the flash controller of FIG. 1.

FIG. 6 illustrates an exemplary read procedure 600 for use by a flash controller to read data previously stored using the flash fast procedure. At 602, the flash controller reads all page-sized segments of the first frame of a stored sequence of image frames from physical NAND memory by accessing the lookup linking table that links each segment to its physical memory location or address. At 604, for each additional frame of the sequence of frames, the flash controller reads all segments of a particular frame by following links in the lookup table to corresponding physical memory addresses, and then combines or merges the segments into a frame, including any matching segments originally stored for a predecessor frame and any unique segments that had been stored separately for the particular frame. At 606, the flash drive controller outputs the sequence of frames, including any frames that have been "reconstructed" from separately stored segments, to the host device for display thereon or to another device.

TABLE I illustrates an exemplary linking table (or mapping or control table) that includes the mapping or linking indexes or indices for tracking the logical block addresses (LBAs) that are written to corresponding NAND physical locations or addresses by the flash drive.

TABLE I

| Index | LBA | Physical Block Location | Linked Index | Segment of Frame |
|---|---|---|---|---|
| 0 | 0-100 | A | — | Segment N in frame M |
| 1 | 101-200 | A + 1 | — | Segment N + 1 in frame M |

TABLE I-continued

| Index | LBA | Physical Block Location | Linked Index | Segment of Frame |
|---|---|---|---|---|
| 2 | 201-300 | A + 2 | — | Segment N + 2 in frame M |
| 3 | 301-400 | A + 3 | — | Segment N + 3 in frame M |
| 4 | 401-500 | A + 4 | — | Segment N + 4 in frame M |
| 5 | 501-600 | A + 5 | — | Segment N + 5 in frame M |
| 6 | 601-700 | A + 6 | — | Segment N + 6 in frame M |
| 7 | 701-800 | — | 0 | Segment N in frame M + 1 |
| 8 | 801-900 | — | 1 | Segment N + 1 in frame M + 1 |
| 9 | 901-1000 | — | 2 | Segment N + 2 in frame M + 1 |
| 10 | 1001-1100 | — | 3 | Segment N + 3 in frame M + 1 |
| 11 | 1101-1200 | — | 4 | Segment N + 4 in frame M + 1 |
| 12 | 1201-1300 | — | 5 | Segment N + 5 in frame M + 1 |
| 13 | 1301-1400 | — | 6 | Segment N + 6 in frame M + 1 |

In the example of TABLE I, the linking table stores row values for the following column values: "Index," "LBA," "Physical Block Location," "Linked Index," and "Segment of Frame." The Index is a value that is sequentially assigned by the flash controller to track LBA's and their memory locations or addresses. The purpose of the Index is to tag each entry in the table in a sequential order. Each Index value corresponds to a different range of LBA's. In circumstances where the LBA corresponds to data that is not linked to a previously stored data segment, the index row lists the corresponding Physical Block Location within the flash (NAND) memory and the corresponding segment of data (e.g. a page or segment N of a frame M of a HD video) but does not include a Linked Index. In circumstances where the LBA corresponds to a segment of data that is linked or mapped to a previously stored data segment, the index row instead lists or records the corresponding Link Index.

By way of example, assume that LBAs (0-700) correspond to segment-A of a previous frame and segment-A is programmed to the NAND flash memory but the data is still held in a double-data rate (DDR) memory of the flash device. Assume also that LBAs (701-1400) correspond to segment-B of a current frame held in DDR, which exactly matches segment-A already programmed to the NAND on Physical Block Locations 'A' through 'A+6'. When the XOR engine of the flash controller compares the two segments and tags the two segments as holding same data, the flash controller firmware then will not program the segment B to the NAND. That is, the LBAs (701-1400) are not programmed to the NAND but are instead linked to LBAs (0-700) that correspond to segment A. These LBAs are indexed in the table as 0 through 6. The indexes (0~6) are used in the Linked Index column for LBAs (701~1400) to indicate that the data in these particular LBAs is exactly the same as in LBAs (0~700).

During a subsequent read command for reading any LBA from (701-1400), the flash controller firmware checks the Linked Index column to detect or confirm the presence of any entry in that column. If an entry is found, the flash controller firmware reads the index corresponding to the LBA read and accesses the table again to find the Index and the corresponding Physical Location on the NAND memory to read the data. For example, if a host requests data from LBA-1150, the flash controller firmware reads the Linked Index column and finds an entry '4'. The flash controller firmware then reads the row with Index-4 and obtains the Physical Address 'A+4' and services the read command from this location.

When an erase operation to delete an image is requested by a host, the flash controller firmware makes sure there are no linked indexes to the pages that correspond to the image for which an erase operation is requested. For example, if an image corresponding to LBAs (0-100) is requested to be deleted (erased) by the host device, the flash controller firmware checks the Linked Indexes to detect or confirm the presence of any linked indexes that correspond to the same Index value. In the example of TABLE I, LBAs-701-800 are linked to the LBAs 0-100 through Linked Index 0. Therefore, even though LBAs 0-100 are released and dereferenced by the flash controller firmware, the physical location or address is not erased. If an erase request is received for an image that corresponds to LBA (0-100) and a Linked Index exists, instead of erasing the Physical Block Location, the flash controller firmware instead dereferences LBA 0-100 and maps the Physical Block Location to LBA 701-800. Once the operation is complete, the index 0 is released for later use.

TABLE II illustrates a portion of a linking table that has been updated to reflect completion of an erase operation, as just described.

TABLE II

| Index | LBA | Physical block location | Linked Index | Segment of Frame |
|---|---|---|---|---|
| — | 0-100 | — | | |
| 7 | 701-800 | A | | |

Figure 7:
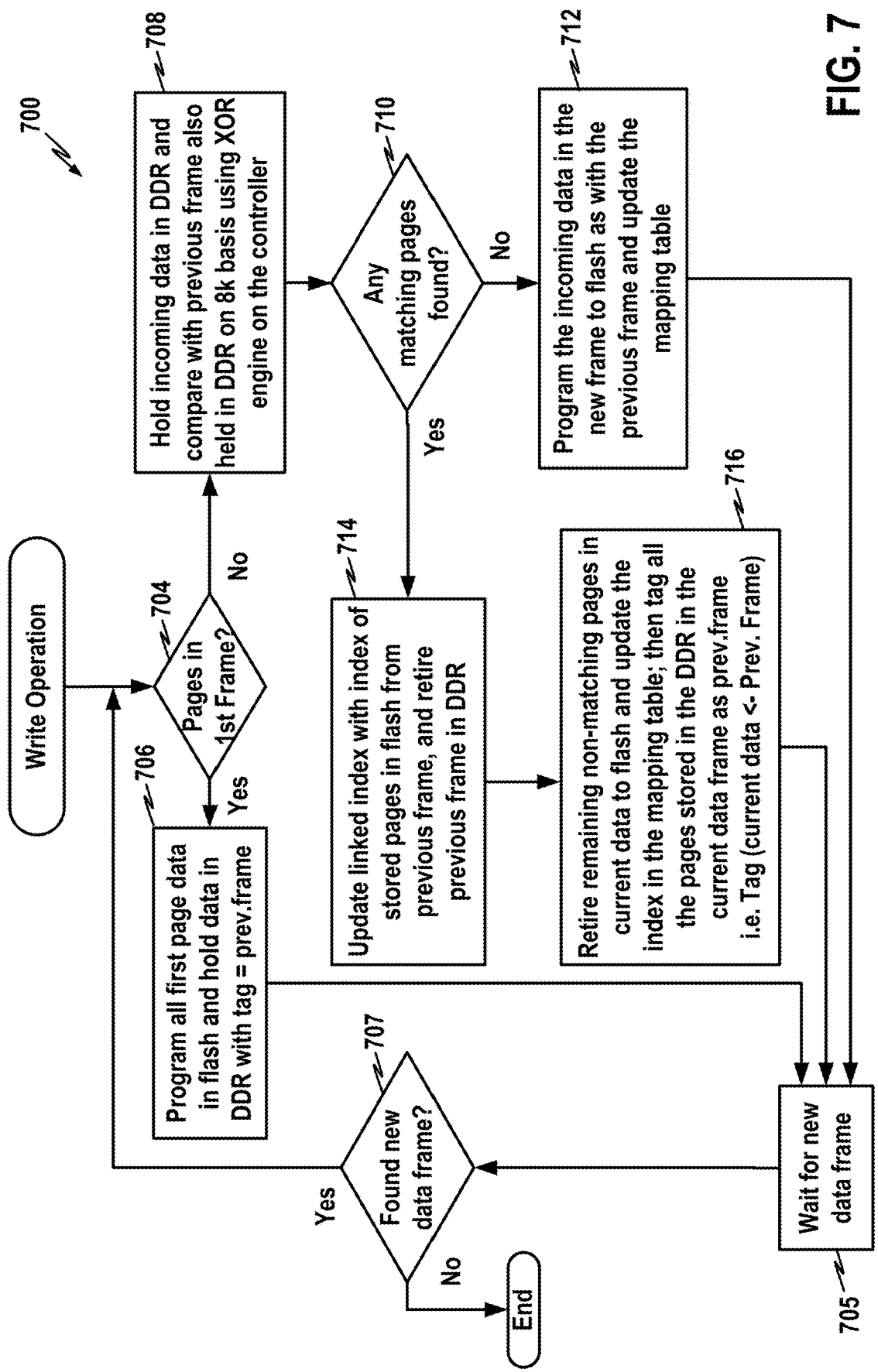
FIG. 7 further illustrates exemplary write operations for use with the flash controller of FIG. 1.

FIG. 7 illustrates details of an exemplary write procedure or operation 700 for use by a flash drive controller, which may exploit TABLE I or other suitable linking or mapping tables. In this example, the write procedure begins sometime following a system startup or power-up, where the flash controller is already configured or programmed with the known frame size of the data to be processed. The flash controller detects pages in a first frame, at decision block 704, and then, at processing block 706, the flash controller programs all first page data in flash and holds data in DDR with tag=prev.frame. The flash controller then waits for a new data frame, at block 705, and, once a new data frame is found, at decision block 707, processing proceeds to block 708 via decision block 704 where the new data is processed (e.g. the data of a next frame).

In processing block 708, the flash controller holds incoming data in DDR and compares the data with the previous frame also held in DDR on an 8 k basis using the XOR engine on the controller. If no matching pages are found or detected, at decision block 710, the flash controller programs the incoming data, at processing block 712, in the new frame to flash as with the previous frame and updates the mapping table. The flash controller again waits for a new data frame, at 705, and, once another new data frame is found, at decision block 707, processing again proceeds to block 708 (via decision block 704) where the new data is processed (e.g. the data of the next frame). However, at decision block 710, if at least one page of the current frame is found to match a corresponding page of the previous frame, then, at processing block 714, the flash controller updates the linked index with the index of stored pages in flash from the previous frame, and retires previous frame in DDR. Then, at processing block 716, the flash controller retires the remaining non-matching pages in the current data to flash and updates the index in the mapping table, and then tags all the pages stored in the DDR in the current data frame as prev.frame. The flash controller again waits for a new data frame, at block 705, and, if no new data frame is found, at decision block 707, the write procedure is complete (i.e. END). Otherwise, processing continues as already described for the next frame.

Figure 8:
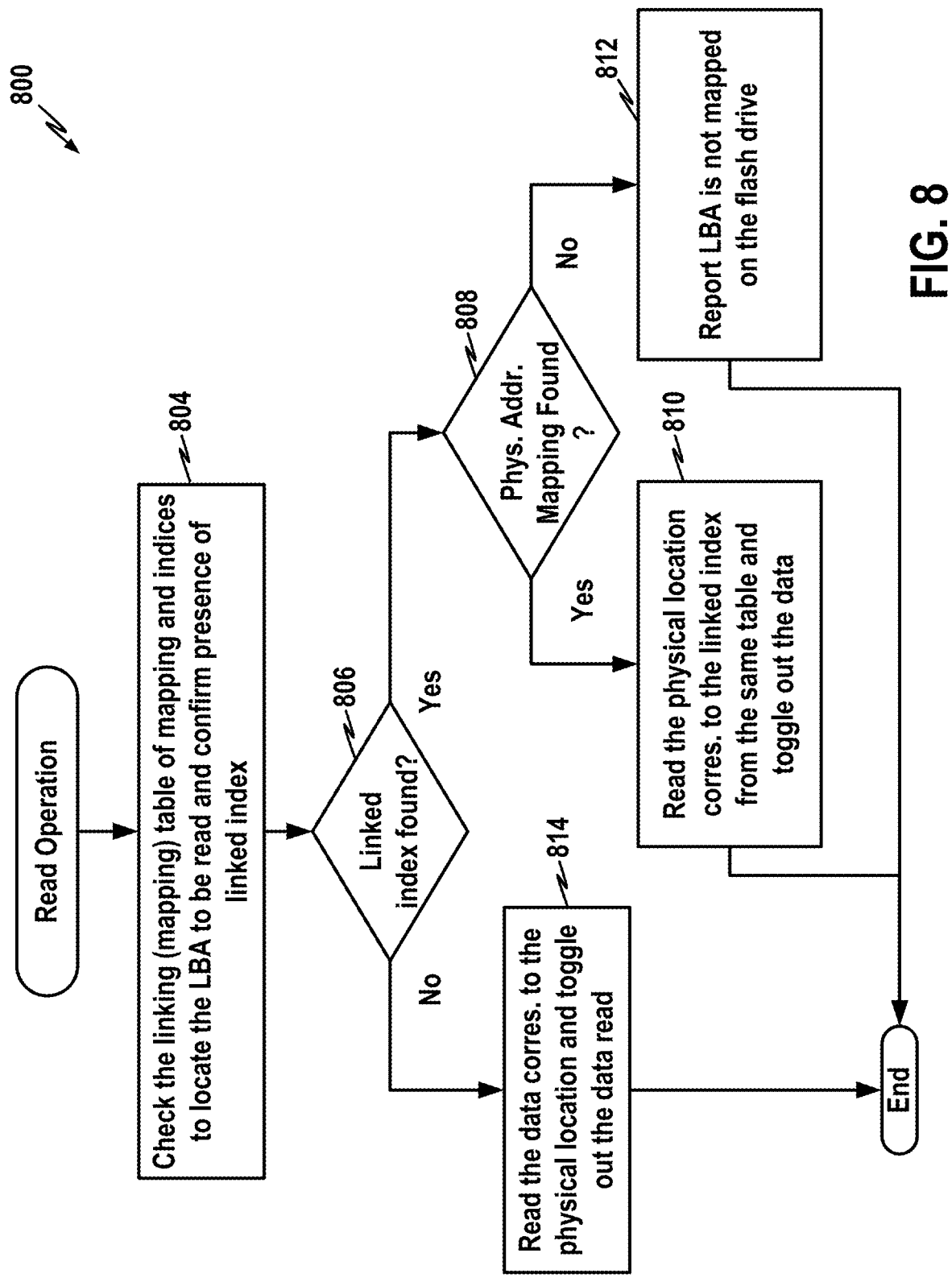
FIG. 8 further illustrates exemplary read operations for use with the flash controller of FIG. 1.

FIG. 8 illustrates details of an exemplary read procedure or operation 800 for use by a flash controller to read a page of data stored using the write procedure of FIG. 7. As with the write procedure, the exemplary read procedure begins sometime following system startup or power-up, with the flash controller knowing the frame size. At block 804, the flash controller checks the linking table to locate the LBA in NAND for the page to be read and to detect or confirm the presence of a linked index in the table for that page. Assuming a linked index is found in the table (via decision block 806), the flash controller then determines whether a physical mapping address is also found for that page (via a decision block 808) for the data. If the physical mapping address is found, then, at 810, the flash controller reads the physical location of the page corresponding to the linked index from the table and toggles out the page of data from the memory device (by accessing that particular physical memory location). However, if, at 808, no physical address mapping was found in the table, processing instead proceeds to block 812 where the flash controller reports to the host device that the LBA is not mapped on the flash drive (e.g. an error is reported to indicate that the LBA identified at 804 does not correspond to a known physical memory address). Still further, if at 806, no linked index was found, then processing proceeds to block 814 where the flash controller reads the page data from memory corresponding to the physical location and toggles out the data that has been read. The read operation for that page is then complete (i.e. END). Although not explicitly shown in FIG. 8, the procedure is then repeated for the next page of data within a current frame, and then for the pages of subsequent frames until all frames are read.

Figure 9:
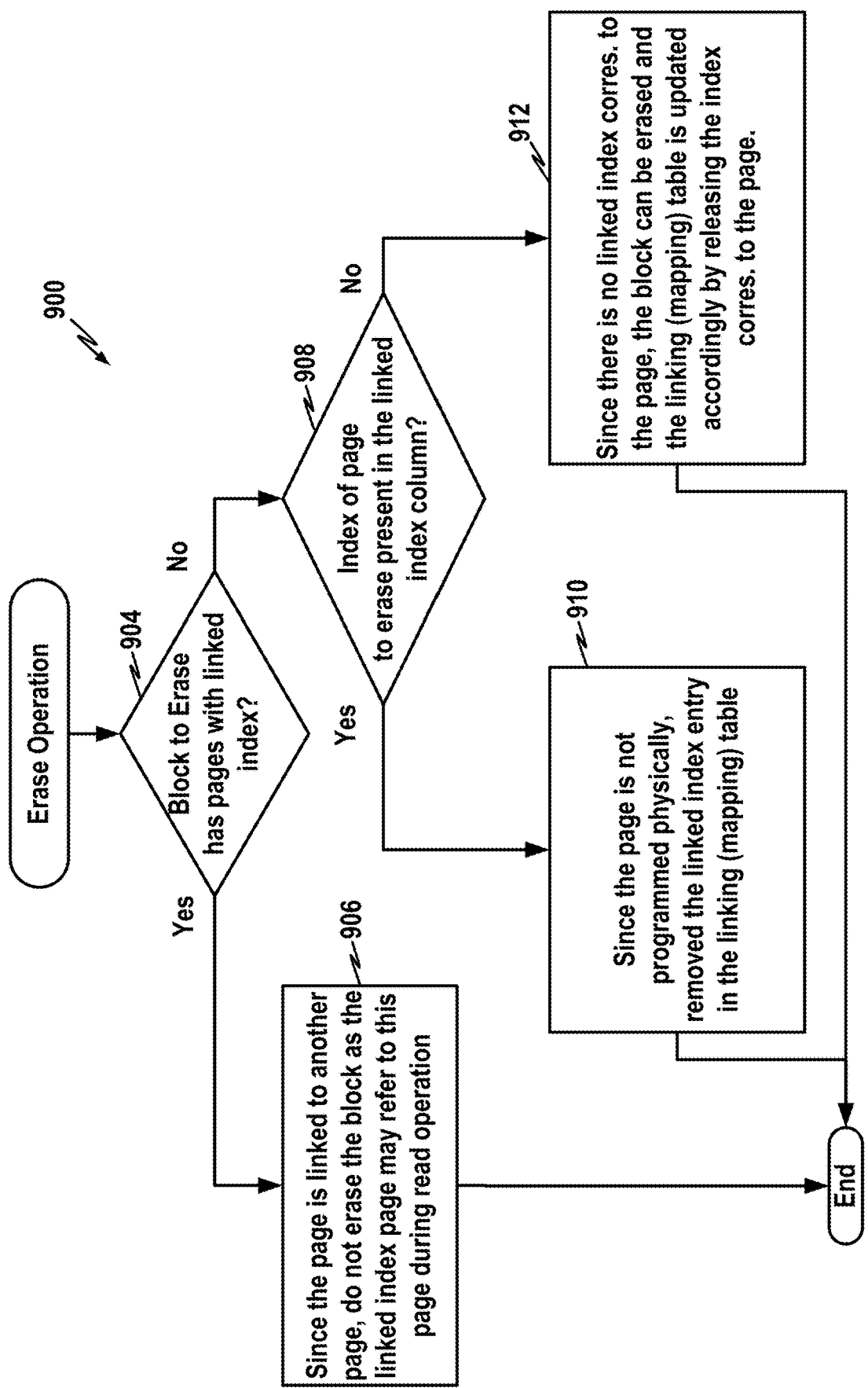
FIG. 9 illustrates exemplary erase operations for use with the flash controller of FIG. 1.

FIG. 9 illustrates further details of an exemplary erase procedure or operation 900 for use by a flash drive controller to erase a page of data stored using the procedure of FIG. 7. As with the read and write procedures, the exemplary erase procedure begins with the flash controller already knowing the frame size. At 904, the flash controller determines whether the block (e.g. frame) to erase has any pages with a linked index in the linking table. If so, then, at 906, since the page is linked to another page, the flash controller does not erase the block because a linked index page may refer to this block during read operation. Assuming, however, that the determination at 904 is NO, then, at 908, the flash controller determines whether the index of the page to erase is present in the linked index column of the table. If so, then, at 910, since the page was not programmed physically, the flash controller removes the linked index entry in the linking (mapping) table. Otherwise, at 912, since there is no linked index corresponding to the page, the block containing the page can be erased and the linking (mapping) table is updated accordingly by the flash controller by releasing the index corresponding to the page. (That is, in this example, the granularity of the erase operation is for a block, rather than a page, although in other implementations a different erase granularity might be used.) Although not shown, the erase procedure may then be repeated for the next page or block of data within a current frame, and then for other frames that need to be erased.

Further Exemplary Embodiments

FIGS. 10-13 illustrate and summarize various general features of exemplary memory controllers and methods or procedures for use with memory controllers.

Figure 10:
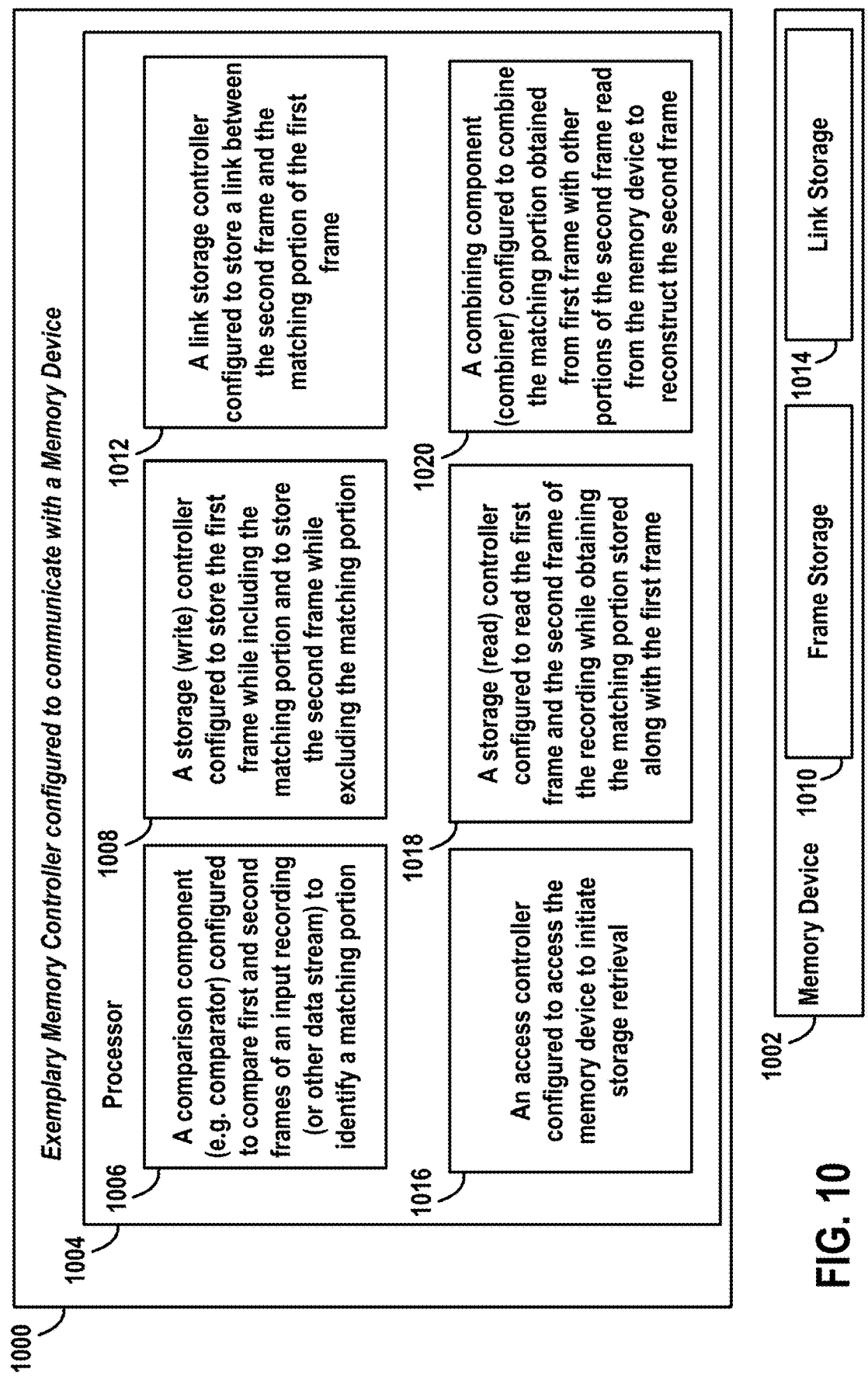
FIG. 10 summarizes features of an exemplary memory controller.

FIG. 10 shows an exemplary memory controller 1000 configured to communicate with a memory device 1002. Although not shown in FIG. 10, the memory controller 1000 may operate in conjunction with a host device, such as a video camera, smartphone or the like, which provides an input recording or other input data stream consisting of sequential frames (e.g. HD video or HR burst mode images). Although many examples described herein relate to a flash controller for storing data within a NAND flash device, the memory device may be any suitable storage device and is not limited to NANDs, and the memory controller may be any suitable memory control device or memory access device and is not limited to flash controllers.

The exemplary memory controller 1000 of FIG. 10 includes a processor 1004 for controlling storage, retrieval and/or erasure of data within the memory device 1002. The exemplary processor 1004 includes a comparison component 1006 (e.g. a comparator such as a XOR engine) configured to compare, at least, first and second frames of an input recording or other input data stream to identify a matching portion and a storage (write) controller 1008 configured to store, at least, the first frame at first physical locations or addresses within the memory device while including the matching portion, and to store the second frame at second physical locations or addresses within the memory device while excluding the matching portion. The frames may be stored in a frame storage portion 1010 of the memory device 1002 that includes first physical memory locations or addresses and second physical memory locations or addresses. As already described, an entire first frame may be stored at the first physical addresses, whereas only non-matching portions of a second frame are stored at the second memory locations or addresses. A link storage controller 1012 is configured to store, at least, a link between the second frame and the matching portion of the first frame to permit the second frame to be "reconstructed" in a subsequent read operation, where the link may be stored in a link storage portion 1014 of the memory device 1002. The link may link or map a logical memory address of the matching portion of the second frame with a physical memory address of the matching portion of the first frame. An access controller 1016 of the processor 1004 is configured to access the memory device 1002 to initiate storage retrieval when one or more frames of the recording or other input data stream needs to be accessed (typically in response to a request from a host). A storage (read) controller 1018 is configured to read, at least, the first frame and the second frame from the memory device 1002 while obtaining the matching portion stored along with the first frame. A combining component (e.g. a combiner) 1020 may be configured to combine the matching portion obtained from first frame with non-matching portions of the second frame to permit reconstruction of the entire second frame, either by the memory controller or a host device receiving the read data. Although described with respect to generalized "first" and "second" frames, the memory controller 1000 of FIG. 10 may sequentially process millions of frames of a recording or other input data stream.

In at least some examples, means may be provided for performing the functions illustrated in FIG. 10 and/or other functions illustrated or described herein. For example, an apparatus (e.g. processor 1004) may be provided for use with a storage device (e.g. memory device 1002) where the apparatus includes: means for comparing first and second frames of an input recording or other input data stream to identify a matching portion (such as comparator 1006); means for storing the first frame at first physical locations or addresses within the memory device while including the matching portion and for storing the second frame at second physical locations or addresses within the memory device while excluding the matching portion (such as storage controller 1008); means for storing a link between the second frame and the matching portion of the first frame (such as link storage 1014); and means for reading the second frame from the memory device while using the link to obtain the matching portion that was excluded during storage of the second frame but was included during storage of the first frame (such as read controller 1018). The apparatus may additionally, or alternatively, include: means for accessing a memory device in which a recording or other input data stream is stored having first and second frames, where a portion of the second frame that matches a matching portion of the first frame is stored along with the first frame at first physical memory locations or addresses and wherein non-matching portions of the second frame are stored at second physical memory locations or addresses (such as access controller 1016); means for reading the first frame of the recording or other input data stream from the first physical addresses of the memory device and for reading the second frame of the recording or other input data stream from the memory device by obtaining the non-matching portions from the second physical addresses and obtaining the matching portion stored along with the first frame from the first physical addresses (such as read controller 1018); and means for combining the matching portion obtained from first frame with the non-matching portions of the second frame to reconstruct the second frame (such as combiner 1020). The frames may be stored in a means for storing frames (such as storage portion 1010). A means for storing a link between the second frame and the matching portion of the first frame may be provided (such as link storage 1014) where the link serves to link or map a physical address of the matching portion of the first frame to a logical address of the matching portion of the second frame. These are just some examples of suitable means for performing the various functions or operations.

In at least some examples, a machine-readable storage medium may be provided having one or more instructions which when executed by a processing circuit causes the processing circuit to performing the functions illustrated in FIG. 10 and/or other functions illustrated or described herein. For example, instructions may be provided for: comparing first and second frames of an input recording or other input data stream to identify a matching portion; storing the first frame at first physical locations or addresses within the memory device while including the matching portion; storing the second frame at second physical locations or addresses within the memory device while excluding the matching portion; storing a link between the second frame and the matching portion of the first frame; and reading the second frame from the memory device while using the link to obtain the matching portion that was excluded during storage of the second frame but was included during storage of the first frame. The instructions may additionally, or alternatively, include instructions for accessing a memory device in which a recording or other input data stream is stored having first and second frames, where a portion of the second frame that matches a matching portion of the first frame is stored along with the first frame at first physical memory locations or addresses and wherein non-matching portions of the second frame are stored at second physical memory locations or addresses. Instructions may also be provided for: reading the first frame of the recording or other input data stream from the first physical addresses of the memory device; reading the second frame of the recording or other input data stream from the memory device by obtaining the non-matching portions from the second physical addresses; and obtaining the matching portion stored along with the first frame from the first physical addresses. These are just some examples of suitable instructions for performing or controlling the various functions or operations.

Figure 11:
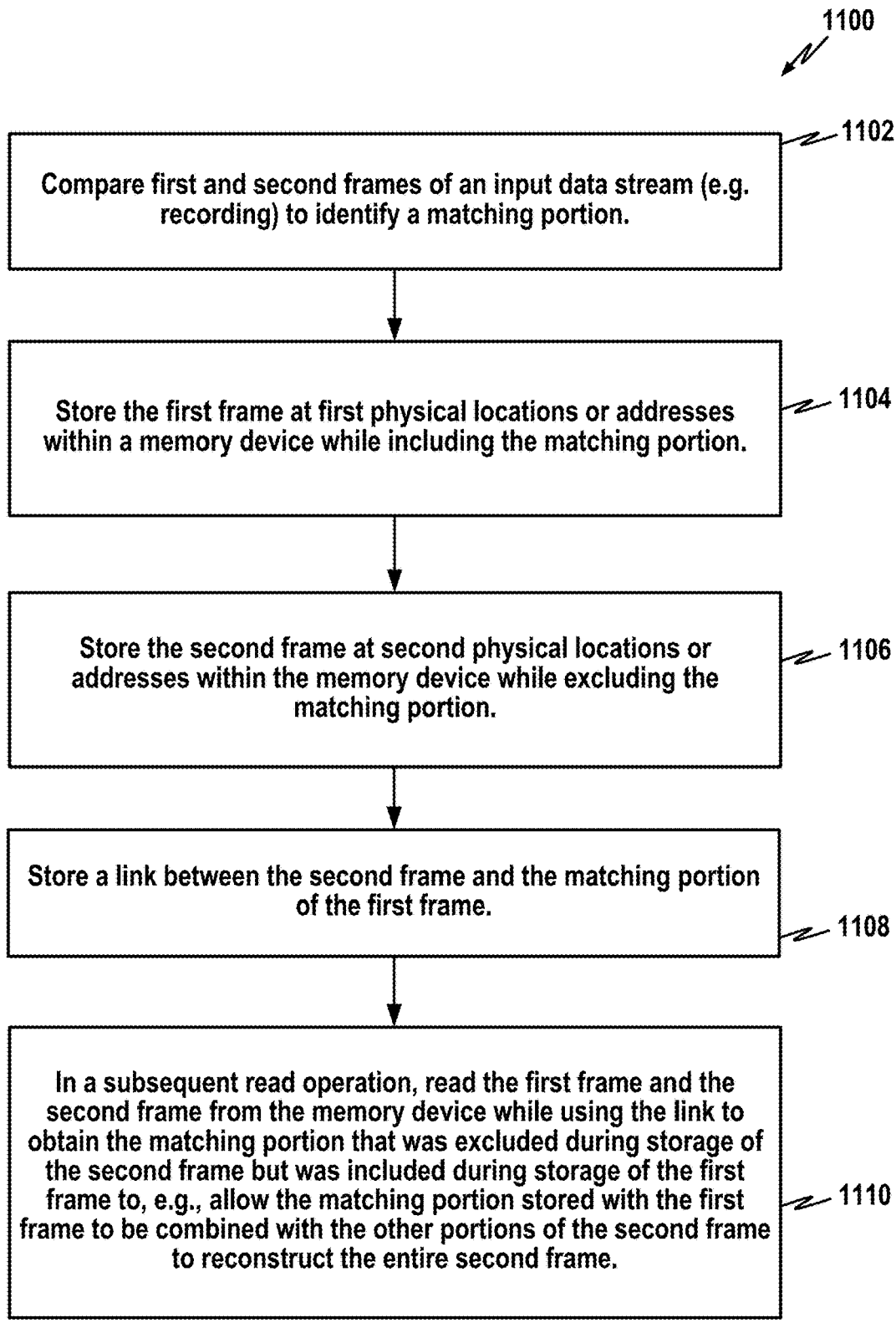
FIG. 11 summarizes exemplary operations for use with the memory controller of FIG. 10 to store recordings.

FIG. 11 broadly summarizes exemplary operations 1100 for use with a memory controller or other suitable device to store or otherwise process recordings or other input data streams. At 1102, the memory controller compares first and second frames of an input data stream (e.g. a recording) to identify a matching portion. At 1104, the memory controller stores the first frame at first physical locations or addresses within a memory device (such as a NAND) while including the matching portion. At 1106, the memory controller stores the second frame at second physical locations or addresses within the memory device while excluding the matching portion. At 1108, the memory controller stores a link between the second frame and the matching portion of the first frame. At 1110, during a subsequent read operation, the memory controller reads the first frame and the second frame from the memory device while using the link to obtain the matching portion that was excluded during storage of the second frame but was included during storage of the first frame to allow the matching portion stored with the first frame to be combined with the other portions of the second frame to reconstruct the entire second frame (where the "reconstruction" of the entire second frame might be done by the memory controller or by a host device).

FIG. 12 further summarizes exemplary operations 1200 for use with a memory controller to store or otherwise process recordings or other input data streams. At 1202, the memory controller compares first and second frames of an input recording to identify a matching portion, where the first and second frames are consecutive frames of a video recording or consecutive frames of burst-mode photographic images, and where the matching portion is identified by comparing a segment N of the second frame with a corresponding segment N of the first frame or with any segments M of the first frame that are adjacent to the segment N of the first frame to detect an identical match (or, alternatively, a substantial match). At 1204, the memory controller stores the first frame at first physical locations or addresses with a NAND while including the matching portion by storing each segment N of the first frame at the first physical memory locations or addresses. At 1206, the memory controller stores the second frame at second physical locations or addresses with the NAND while excluding the matching portion by storing each segment M of the second frame that does not match any segment N of the first frame, and then repeat the process for additional frames. At 1208, the memory controller stores a link between the second frame and the matching portion of the first frame by generating an index that links a logical address of the portion of the second frame that is not stored with a physical address of the matching portion of the first frame that is stored, and then repeats the process for additional frames. At 1210, during a subsequent read operation, the memory controller reads the entire first frame of the recording from the memory device from the first physical addresses and then reads the second frame while using the link to obtain the matching portion stored among the first physical addresses that was excluded during storage of the second frame (from the second physical addresses) but included during storage of the first frame). At 1212, the memory controller may combine the matching portion obtained from first frame with non-matching portions of the second frame read from the memory device to reconstruct the second frame, and the repeats the operations for additional frames. In other examples, the memory controller merely outputs the read data to an external host that may then combine the various portions of the second frame together.

Figure 13:
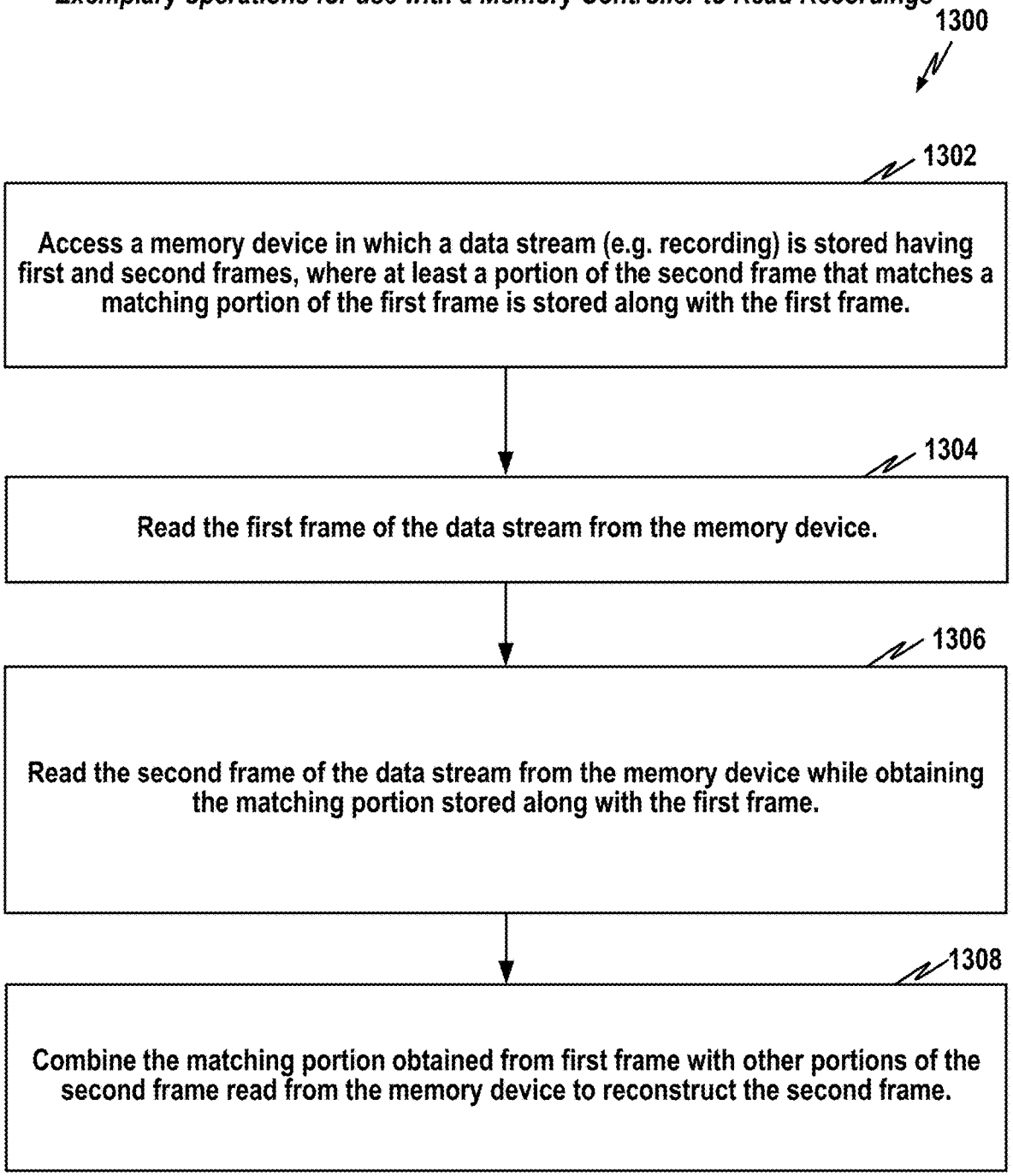
FIG. 13 summarizes exemplary operations for use with the memory controller of FIG. 10 to read recordings or other data streams.

FIG. 13 summarizes exemplary operations 1300 for use with a memory controller to read or otherwise process recordings or other data streams. At 1302, the memory controller accesses a memory device in which a data stream (e.g. a recording) is stored having first and second frames, where at least a portion of the second frame that matches a matching portion of the first frame is stored along with the first frame. At 1304, the memory controller reads the first frame of the data stream from the memory device. At 1306, the memory controller reads the second frame of the recording from the memory device while obtaining the matching portion stored along with the first frame. At 1308, the memory controller combines the matching portion obtained from first frame with non-matching portions of the second frame read from the memory device to reconstruct the second frame.

FIG. 14 further summarizes exemplary operations 1400 for use with a memory controller to read or otherwise process recordings or other data streams. At 1402, the memory controller accesses a memory device in which a recording or other data stream is stored having first and second frames, where a matching portion of the second frame that matches a portion of the first frame is stored at first physical addresses along with the first frame but not at second physical addresses along with the second frame, and where the first and second frames are consecutive frames of a video recording or consecutive frames of burst-mode photographic images, and where the matching portion is a segment N of the second frame that identically (or substantially) matches a corresponding segment N of the first frame or identically (or substantially) matches any segments M of the first frame that are adjacent to segment N of the first frame. At 1404, the memory controller reads the entire first frame of the recording from the first physical addresses of the memory device by reading each segment N of the first frame. At 1406, the memory controller reads the second frame of the recording from the memory device while obtaining the matching portion stored along with the first frame by reading each segment of the second frame that is stored at the second physical addresses for the second frame and reading any matching portion N that was stored along with the first frame at the first physical addresses by accessing an index that links a logical address of the matching portion of the second frame to the first frame. At 1408, the memory controller (or other device) may combine the matching portion obtained from the first physical addresses of the first frame with the other (non-matching) portions of the second frame read from the second physical addresses to reconstruct the second frame, and repeats the process for additional frames.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A method for use with a memory device comprising:
comparing first and second frames of an input data stream to identify a matching portion;
storing the first frame at first physical addresses within the memory device while including the matching portion, the matching portion stored at particular physical block addresses within the first physical addresses;
storing the second frame at second physical addresses within the memory device while excluding the matching portion;
storing a link between the second frame and the first frame, the link including a primary index corresponding to the particular physical block addresses of the first frame and a linked index corresponding to logical block addresses of the second frame, wherein the primary index is distinct from its corresponding physical block addresses and the linked index is distinct from the corresponding logical block addresses, and wherein the linked index refers to the primary index for matching portions of the first and second frames but does not refer to the primary index for non-matching portions of the first and second frames; and
reading the second frame from the memory device while using the link to obtain the matching portion that was excluded during storage of the second frame but was included during storage of the first frame.

2. The method of claim 1, wherein the input data stream comprises one or more of a video data stream or a sequence of burst-mode photographic images.

3. The method of claim 1, wherein comparing the first and second frames of the input data stream to identify the matching portion comprises comparing a segment (N) of the second frame with a corresponding segment (N) of the first frame.

4. The method of claim 3, further comprising:
comparing the segment (N) of the second frame with one or more segments (M) of the first frame that are adjacent to the segment (N) of the first frame.

5. The method of claim 1, wherein comparing the first and second frames to identify the matching portion comprises identifying a portion of the second frame that identically or substantially matches a portion of the first frame.

6. The method of claim 1, wherein storing the first frame while including the matching portion comprises storing each segment (N) of the first frame, and wherein storing the second frame while excluding the matching portion comprises storing each segment (M) of the second frame that does not match any segment (N) of the first frame.

7. The method of claim 1, wherein the memory device is configured to store data in word lines and wherein the matching portion comprises a word line of data.

8. The method of claim 1, wherein storing the link comprises:
storing the primary index, a logical block address (LBA) corresponding to the primary index, and a particular physical block address (PBA) corresponding to the matching portion of the first frame in a first row of a linking table; and
storing the linked index and the LBA corresponding to the matching portion of the second frame in a second row of the linking table.

9. The method of claim 8,
wherein, for an LBA that corresponds to a segment of the input data stream not linked to a previously stored matching portion, a corresponding row of the linking table omits a linked index value or stores a null value; and
wherein, for an LBA that corresponds to a segment linked to a previously stored matching portion, the corresponding row of the linking table includes a linked index value.

10. A memory controller for use with a memory device, comprising:
a processor configured to
compare first and second frames of an input data stream to identify a matching portion;
store the first frame at first physical addresses within the memory device while including the matching portion, the matching portion stored at particular physical block addresses within the first physical addresses;
store the second frame at second physical addresses within the memory device while excluding the matching portion;
store a link between the second frame and the first frame, the link including a first index corresponding to the particular physical block addresses of the first frame and a second index corresponding to logical block addresses of the second frame, wherein the first index is distinct from its corresponding physical block addresses and the second index is distinct from the corresponding logical block addresses, and wherein the second index refers to the first index for matching portions of the first and second frames but does not refer to the first index for non-matching portions of the first and second frames; and
read the second frame from the memory device while using the link to obtain the matching portion that was excluded during storage of the second frame but was included during storage of the first frame.

11. The memory controller of claim 10, wherein the input data stream comprises one or more of a video data stream or a sequence of burst-mode photographic images.

12. The memory controller of claim 10, wherein the processor is further configured to compare the first and second frames of the input data stream to identify the matching portion by comparing a segment (N) of the second frame with a corresponding segment (N) of the first frame.

13. The memory controller of claim 12, wherein the processor is further configured to compare the segment (N) of the second frame with one or more segments (M) of the first frame that are adjacent to the segment (N) of the first frame.

14. The memory controller of claim 10, wherein the processor is further configured to compare the first and second frames to identify the matching portion by identifying a portion of the second frame that identically or substantially matches a portion of the first frame.

15. The memory controller of claim 10, wherein the processor is further configured to store the first frame while including the matching portion by storing each segment (N) of the first frame and is further configured to store the second frame while excluding the matching portion by storing each segment (M) of the second frame that does not match any segment (N) of the first frame.

16. The memory controller of claim 10, wherein the memory device is configured to store data in word lines and wherein the matching portion comprises a word line of data.

17. The memory controller of claim 10, wherein the processor is further configured to store the link by:

storing the first index, a logical block address (LBA) corresponding to the first index, and a particular physical block address (PBA) corresponding to the matching portion of the first frame in a first row of a linking table; and storing the second index and the LBA corresponding to the matching portion of the second frame in a second row of the linking table.

18. The memory controller of claim 17, wherein the processor is further configured to, in response to an LBA that corresponds to a segment that is not linked to a previously stored matching portion, control the corresponding link to associate a corresponding PBA to a corresponding segment while omitting a second index value or while storing a null value; and wherein the processor is further configured to, in response to an LBA that corresponds to a segment that is linked to a previously stored matching portion, control the corresponding link to store a second index value.

19. An apparatus for use with a memory device, comprising:

means for comparing first and second frames of an input data stream to identify a matching portion;

means for storing the first frame at first physical addresses within the memory device while including the matching portion, the matching portion stored at particular physical block addresses within the first physical addresses;

means for storing the second frame at second physical addresses within the memory device while excluding the matching portion;

means for storing a link between the second frame and the first frame, the link including a primary index corresponding to the particular physical block addresses of the first frame and a linked index corresponding to logical block addresses of the second frame, wherein the primary index is distinct from its corresponding physical block addresses and the linked index is distinct from the corresponding logical block addresses, and wherein the linked index matches the primary index for matching portions of the first and second frames but does not match the primary index for non-matching portions of the first and second frames; and means for reading the second frame from the memory device while using the link to obtain the matching portion that was excluded during storage of the second frame but was included during storage of the first frame.

20. The apparatus of claim 19, wherein the means for storing the link further comprises:

means for storing the primary index, a logical block address (LBA) corresponding to the primary index, and a particular physical block address (PBA) corresponding to the matching portion of the first frame in a first row of a linking table; and means for storing the linked index and the LBA corresponding to the matching portion of the second frame in a second row of the linking table.

21. The apparatus of claim 20, wherein the means for storing the link further comprises:

means, operative in response to an LBA that corresponds to a segment that is not linked to a previously stored matching portion, for configuring the corresponding link to associate a corresponding PBA to a corresponding segment while omitting a linked index value or while storing a null value; and means, operative in response to an LBA that corresponds to a segment that is linked to a previously stored matching portion, for configuring the corresponding link to store a linked index value.

* * * * *